United States Patent [19]
Lambert et al.

[11] 3,923,665
[45] *Dec. 2, 1975

[54] DEMAND BACTERICIDE FOR DISINFECTING WATER AND PROCESS OF PREPARATION

[75] Inventors: Jack L. Lambert; Louis R. Fina, both of Manhattan, Kans.

[73] Assignee: Kansas State University Research Foundation, Manhattan, Kans.

[ * ] Notice: The portion of the term of this patent subsequent to June 18, 1991, has been disclaimed.

[22] Filed: Apr. 3, 1974

[21] Appl. No.: 457,633

Related U.S. Application Data

[63] Continuation-in-part of Ser. No. 308,553, Nov. 21, 1972, Pat. No. 3,817,860, and a continuation-in-part of Ser. No. 86,246, Nov. 2, 1970, abandoned, and a continuation-in-part of Ser. No. 881,923, Dec. 3, 1969, abandoned.

[52] U.S. Cl. ................... 210/501; 21/58; 424/79; 424/150
[51] Int. Cl.² ............................................ C02B 3/06
[58] Field of Search ............ 210/24, 29, 37, 60, 62, 210/64, 501; 21/58; 424/79, 150

[56] References Cited
UNITED STATES PATENTS

| | | | |
|---|---|---|---|
| 3,316,173 | 4/1967 | Mills et al. | 210/62 |
| 3,425,790 | 2/1969 | Sloan | 210/37 x |
| 3,436,345 | 4/1969 | Goodenough et al. | 210/62 |
| 3,462,363 | 8/1969 | Mills | 210/62 X |
| 3,772,189 | 11/1973 | Kreusch et al. | 210/62 X |
| 3,817,860 | 6/1974 | Lambert et al. | 210/29 |

*Primary Examiner*—Thomas G. Wyse

[57] ABSTRACT

A demand bactericide for disinfecting water comprises a strong base anion exchange resin containing a bactericidally effective amount of triiodide for killing bacteria in water while being essentially free of water-elutable oxidizing iodine. The invention also extends to the process of preparing the demand bactericide wherein the resin-triiodide complex is washed with water until the wash water gives a negative test for oxidizing iodine, the resin preferably being a quaternary ammonium resin which is first reacted with an alkylating agent to eliminate residual amine groups.

12 Claims, No Drawings

DEMAND BACTERICIDE FOR DISINFECTING WATER AND PROCESS OF PREPARATION

CROSS-REFERENCE

This application is a continuation-in-part of co-pending application Ser. No. 308,553, filed Nov. 21, 1972, now U.S. Pat. No. 3,817,860, and of prior applications Ser. Nos. 86,246, filed Nov. 2, 1970, and 881,923, filed Dec. 3, 1969, now abandoned. The benefit of 35 U.S.C. Sec. 120 is claimed with respect to said applications Ser. Nos. 308,553, 86,246, and 881,923.

BACKGROUND AND SUMMARY

There are relatively few ways chemically to treat water so that microorganisms are destroyed without leaving behind residual bactericide. The most widely used treatment is that with chlorine. The other halogens, bromine and iodine, have been used much less and their usefulness has largely been left to the treatment of swimming pools. Ozone is the only other substance used in large scale treatment in competition with chlorine. Boiling of water is effective but cumbersome except on a small scale.

With rapid growth in population and the attendant increase in pollution of our water supplies, few sources of water can be considered free of possible contamination. A convenient, safe and foolproof method would thus be of great value. For example, current methods of treatment of swimming pool water often leave residual chlorine in concentrations irritating to the eyes and mucous membranes. A disinfectant operating on the demand principle, as does the disinfectant of the present invention, thus would be expected to find wide acceptance.

Heretofore, anion exchange resins, such as the quaternary ammonium resins, have not been considered to be of much value for disinfecting water. Certain quaternary ammonium compounds when used in aqueous solutions have bactericidal properties, but ordinary quaternary ammonium anion exchange resins demonstrate only very weak bactericidal action. Thus water contaminated with live bacteria can be passed through a bed of strong base anion exchange resin without appreciably reducing the live bacteria therein.

Water disinfecting agents such as chlorine, bromine, and iodine are employed in their elemental rather than halide or salt form. It is well known that chloride, bromide, and iodide ions have little or no bactericidal action. For example, bacteria are not killed on being contacted with dilute aqueous solutions of sodium chloride, potassium iodide, etc. Triiodide ions in solutions have been reported to have negligible germicidal properties compared to diatomic iodine or other halogens in elemental form. [See *J. Bacteriol.*, 69:413–417 (1955), and *Arch. Biochem.*, 6:261–268 (1945).]

U.S. Pat. No. 3,316,173 discloses a process for treating water with bromine wherein a strong base anion exchange resin is used as a source of diatomic or elemental bromine, the bromine being eluted from the resin to form a relatively concentrated aqueous solution, which is subsequently mixed with a larger volume of water, such as the water in a swimming pool, to provide a bactericidal concentration of bromine. The bromine is eluted from the resin in concentrations of from 10 to 10,000 p.p.m., which is far above physiologically acceptable levels of bromine in water for human consumption.

U.S. Pat. No. 3,462,363 discloses a further extension of the process of the cited patent, wherein a scavenger resin is used in tandem with a strong base anion exchange resin in polyhalide form, to reduce residual halogen in the treated water to a physiologically acceptable level. In the first step of the process, the water containing the microorganisms elutes elemental halogen from the resin to provide a halogen concentration in the water exceeding 5 p.p.m. (5,000 p.p.b.). On the completion of the bactericidal action, the residual halogen is reduced to a level of no more than 1.0 p.p.m. by passing the solution through a second anion exchange resin capable of absorbing the halogen.

Based on prior knowledge, such as the teachings of the above-cited patents, the demand bactericide of the present invention is believed to be unobvious, and the results obtained to be of a surprising and unexpected nature. No one heretofore has provided the water treatment art with a means for disinfecting water with iodine (or other halogen) without introducing the bactericidal halogen into the water in detectable concentrations.

In accordance with the present invention, a strong base anion exchange resin is reacted with triiodide ions to form a stable compound of extremely low dissociation in water. The association of the triiodide ions with the basic exchange sites (cationic groups) of the resin is such as to block the sites from normal ion exchange with ions in the solution. The amount of iodine ($I_2$), triiodide ($I_3-$), or other oxidizing form of iodine liberated in the water is negligible, being below the ordinary limits of detection. Nevertheless, the resin compound is a potent bactericide. By some mechanism not yet fully undertood, the insolubilized triiodide groups of the resin "interact" with bacteria without forming a detectable concentration of iodine (or any oxidizing form thereof) in the water. The killed bacteria do not remain attached to the resin, but will readily pass on through a bed of the resin. Complete bacterial sterilization of highly contaminated water can thus be achieved without introducing objectionable amounts of iodine into the water. The amount of iodine liberated, if any, by the interaction of the bacteria with the insolubilized triiodide is below the limits of detection by the highly sensitive cadmium iodide-linear starch test. The disinfected water is thereby ready for immediate use as drinking water, or for other applications where bacterially sterile iodine-free water is desirable. No further treatment will ordinarily be required.

DETAILED DESCRIPTION

The present invention can be practiced with any strong base anion exchange resin, but quaternary ammonium anion exchangers are preferred, the term "strong base anion exchange resin" designates a class of resins either containing strongly basic (cationic) groups, such as quaternary ammonium groups, or which have strongly basic properties substantially equivalent to quaternary ammonium anion exchange resins. The classification of "strong base" resins contrasts with the "weak base" resins where the basic groups are amine nitrogen rather than quaternary ammonium groups. In addition to the quaternary ammonium resins, which are commercially available from a number of companies, other strong base resins are known, such as the tertiary sulfonium resins, the quaternary phosphonium resins and the alkyl pyridinium resins. Literature citations showing methods of preparation of strong base anion exchangers not readily commercially available in the United States are:

*Tertiary Sulfonium Anion Exchangers:* G. J. deJong (to Stamicarbon N.V.), U.S. Pat. No. 2,713,038, July 12, 1955, and Staatsmijnen in Limburg, Directie van de, Dutch Pat. Nos. 77,245, Apr. 15, 1953, and 75,968, Sept. 15, 1954; British Pat. No. 737,924, Oct. 5, 1955.

Quaternary Phosphonium Anion Exchangers: Stamicarbon N.V., Dutch Pat. No. 75,705, Aug. 16, 1954.

Alkyl Pyridinium Anion Exchangers: U.S. Pat. No. 2,739,948, Mar. 27, 1956.

Commercially available quaternary ammonium anion exchange resins which can be used in practicing the present invention include Rexyn 201 (Fisher Scientific Co.), Amberlite IRA-400 and Amberlite IRA-401 S (Mallinckrodt Chemical Works), Ionac A-540 (Matheson, Coleman & Bell), Dowex 1 and Dowex 21K (Dow Chemical Co.), and Duolite A-101D and ES-109 (Diamond Shamrock Chemical Co.). These resins contain quaternary ammonium ion exchange groups bonded to styrene polymer chains, and are supplied in the salt form, usually as the chloride or sulfate, and are in the form of porous granular or "beads" of various mesh sizes.

The terms "triiodide" or "triiodide ion" as used in this application refer to ions formed from iodine which have a valance of −1, but which contain three iodine atoms. The iodine ion ($I^-$) combines with molecular iodine ($I_2$) to form the triiodide ion ($I_3^-$). If more of the elemental iodide ($I_2$) combines with the monovalent triiodide ion ($I_3^-$) higher polyiodide ions can be formed, for example, the polyiodide ions $I_5^-$, $I_7^-$, etc.

The only polyiodide or other polyhalide usable in the present invention is the triiodide. Higher polyiodide ions, although combined with the strong base anion exchange resin, release molecular iodine ($I_2$) into the solution. The trihalides other than triiodide also release halogen into the water although absorbed on strong base anion exchange resins. The triiodide is unique in that the iodine of the triiodide resin compound is not eluted by contact with water down to and below detection limits. It is believed that concentration of oxidizing iodine in the column eluents is so negligible as to be in the range of 50 to 200 p.p.b., and perhaps below 100 p.p.b. (parts per billion).

Suitable procedures for preparing solutions and salts of polyhalide ions, including the polyiodide, are described in the literature. (See, for example, A. I. Popov and R. E. Buckles, "Polyhalogen Complex Salts," Preparation No. 46, in INORGANIC SYNTHESES, Vol. V. ed. by T. Moeller, McGraw-Hill Book Company, Inc., New York, 1957, pp. 167–178.) In following such procedures for the purposes of the present invention, molecular iodine can be dissolved in a water solution of the iodide salt. For example, iodine is dissolved in a solution of sodium or potassium iodide. This solution will contain the monovalent ion $I^-$ which will combine with the dissolved iodine $I_2$, to form the polyiodide ions. By employing one mole of $I_2$ per mole of $I^-$, substantially only the triiodide ions will be formed. If stoichiometric excess quantities of $I_2$ are used, some of the higher polyiodide ions may be formed, and special steps may be necessary to remove the excess iodine from the resin. In another procedure, the resin is first converted to the iodide ($I^-$) form by contacting it with a solution of potassium or sodium iodide, or other iodide salt, and a stirred aqueous slurry of the converted resin is contacted with elemental iodine ($I_2$) to react with the absorbed $I^-$ to form bound $I_3^-$. This procedure is less desirable, since it is more difficult to assure precise saturation of the column with triiodide.

In preparing the resin for use in the method of this invention, the aqueous solution of the triiodide ions can be contacted with a salt form of the resin at ordinary room temperatures (25° to 30°C.) to obtain the disinfectant. The reaction is preferably carried out in batch, the reacted resin being separated from the solution by filtration or centrifugation. However, the resin can be reacted in a bed or column by flowing the triiodide solution through the resin bed, but greater washing may be required to produce the stable demand bactericide. The essential reaction can be visualized as follows:

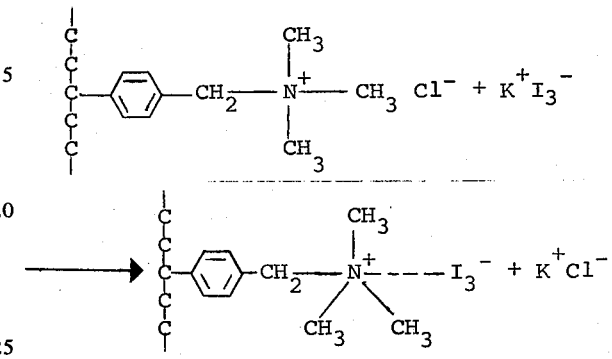

In the above equation, the quaternary ammonium anion exchange resin is represented with three methyl groups bonded to the basic nitrogen, which is also bonded to the styrene polymer, and the resin is shown as being originally in the chloride form. It will be understood, however, that other short chain aliphatic groups can be bonded to the nitrogen, such as ethyl or hydroxyethyl groups, and that the resin can be in other salt forms, such as the sulfate form.

In the resin-triiodide compound, as indicated, the triiodide becomes closely bound to the fixed quaternary ammonium group, or other strongly basic group, and is thereby insolubilized. The other ions present, such as the potassium and chloride ions, can be washed out of the resin compound. If excess triiodide or iodine is present in the reaction solution, this must be washed out of the resin compound by percolating water through a column or bed, or by batch washing, followed by filtration or centrifugation. Distilled or ion free water is preferably used with a stoichiometric excess of triiodide, since prolonged washing may be required to remove the excess.

As a variation of the preparatory procedure, the reacted resin can first be washed with an aqueous iodide salt solution before being washed with water. These washes can be alternated and repeated as required with the final wash being ion free water. With careful preparation, however, the iodide salt wash is not necessary. The procedure of an iodide salt wash is particularly desirable if the reaction solution may have contained polyhalide ions higher than $I_3^-$. For example, an iodide (I) salt solution (viz. sodium, potassium, or ammonium iodide) can be used. The iodide salt solution wll convert any resin-bonded higher polyiodides ($I_5^-$, $I_7^-$, etc.) into the triiodide by removal of the excess $I_2$ to form solution $I_3^-$ ions from the soluton $I^-$ ions. Washing with water, if continued long enough, can accomplish the same result. Preferably, are is exercised to use no more than the stoichiometric proportons of $I^-$ and $I_2$ so that substantially only triiodide attaches to the resin. The resin can be undersaturated with triiodide with a corresponding reduction in killing capacity. Since the capacity is great due to the demand action, reductions to 70 to 80 percent saturation are practical. However, the desired stable washed-out resin compound can readily be prepared by using only a slight reduction in the stoichiometric proportion, such as 96 to 98 percent saturation, and the resulting reduction in capacity is significant.

The triiodide resin compound, formed as described, can be used to disinfect water by batch contacting with the contaminated water, but continuous processing is preferred. Water containing the viable bacteria to be killed is preferably passed through a bed of porous granular material, which consists of the strong base anion exchange resin prereacted with the triiodide ions. The maximum permissible flow rates for total bacterial sterilization will vary with the concentration of the triiodide groups in the resin and with the concentration of live bacteria in the water. However, sufficiently high flow rates are feasible so that the water being disinfected can be pumped through columns of the resin compound while obtaining 100 percent kill of the bacteria. The progress of the disinfecting can be checked by taking samples of the water after treatment. In practice, potable innocuous water is readily produced, the contaminated water being disinfected without being made non-drinkable by the incorporation of physiologically objectionable free iodine, or bactericidal oxidizing forms of iodine. The treated water will contain low concentrations (below 5 p.p.m.) of fully reduced iodine, as iodide ($I^-$). If the amount of iodide in the water is considered objectionable, it can be reduced by conventional procedures, such as adsorption of $I^-$ on a strong base ion exchange resin in the chloride or sulfate form.

The preparation, use, and properties of the demand bactericide of this invention are further illustrated by the following examples.

EXAMPLE I

A preferred procedure for preparing the demand bactericide is as follows:

A specified amount of a commercially obtained quarternary ammonium anion exchange resin which is received in the chloride form is measured out by wet volume in a graduated cylinder. The resin slurry is then washed twice with two times its volume of ethanol. After the second wash, enough ethanol is added to just cover the resin. Next, an amount of alkylating agent, such as dimethyl sulfate, is added sufficient to react with all the exchange sites as indicated by the capacity of the resin supplied by the manufacturer on a weight or volume basis. After reaction overnight, the supernatant is decanted and the resin washed twice with ethanol followed by two washings with double distilled, deionized water.

The triiodide solution is prepared by placing equal amounts of KI and crystalline $I_2$ on a molar weight basis in a flask, adding water very slowly (almost dropwise) with constant shaking until the $I_2$ is in solution. A suitable recipe is as follows: Add 8.3 parts by weight of potassium iodide (or equivalent weight of any other soluble iodide salt) and 12.7 parts by weight of iodine. Then add double distilled, deionized $H_2O$ very slowly with constant shaking until the $I_2$ is completely dissolved (excess $H_2O$ at this point may cause the $I_2$ to recrystallize). If 8.3 grams of potassium iodide and 12.7 grams of iodine are used, the total volume at this point is between 10 and 25 ml. or a concentration of 2 to 5 molar.

Aliquots of the resin bead slurry are transferred to this solution with a pipette until a weight volume of resin containing an exchange capacity equivalent to the triiodide in the solution has been added. This technique allows the addition of resin with a minimal amount of water. Excess water in the first few aliquots may cause iodine recrystallization. Let the resulting mixture stand overnight. The next day, decant excess supernatant from the reacted resin beads, and then place the beads in a column. Wash the resin beads with sufficient double distilled, deionized water until the silver nitrate test (turbidity for $I^-$) and the cadmium iodide-linear starch test (blue color for $I_2$) are essentially negative (see Example III).

The foregoing procedure involves realkylation of the commercial resin, which though sold as quaternary ammonium resins usually contain some tertiary amine groups (e.g., benzyl dimethyl amine groups for the polystrene base resins) due to incomplete alkylation. Such residual amine groups function as weak base anion exchange groups and therefore should be eliminated. Methylating agents, such as methyl bromide or dimethyl sulfate can be used to insure completeness of alkylation of the nitrogen sites, that is, to bond a total of three methyl groups to the nitrogens, and provide substantially all of the basic exchange groups as quaternary ammonium groups (e.g., as benzyl trimethyl ammonium groups when the base resin is polystyrene). Other alkylating agents can be used, including ones providing longer chain alkyl groups, such as $C_1$ to $C_4$ alkyl groups, but there appears to be no advantage to such longer chain alkylating agents over methyl alkylating agents. Iodide alkylating agents can be used, such as methyl iodide, but the presence of the iodide is believed undesirable. The preferred alkylating agent is dimethyl sulfate as used in the above procedure.

EXAMPLE II

A batch of quaternary ammonium (strong base) ion exchange resin-triiodide ion bactericide, for use on laboratory scale, was prepared in the following manner:

Solid iodine was added to a 1 molar aqueous solution of potassium iodide (166 grams potassium iodide per liter of solution) so as to produce an iodide:iodide ratio of 3.5:1. Sufficient volume of this solution was used to provide a calculated excess over the capacity of the quantity of strong base resin used. The resin beads (in the commercial chloride or sulfate form) were placed in a glass column and the potassium triiodide solution was passed through at a slow rate so as to saturate the resin's quanternary ammonium exchange sites with triiodide ion, after which the column was thoroughly washed with distilled water. Final washes of the column so prepared showed no detectable oxidant (iodine or triiodide ion), when tested with cadmium iodide-linear starch reagent (see Example III), or iodide ion, when tested with silver nitrate solution. Resin triiodide combinations, prepared from Ionac A-540 (Matheson, Coleman and Bell), Rexyn 201 (Fisher Scientific Co.), or Amberlite IRA-400 (Mallinckrodt Chemical Works) strong base ion exchange resins in the chloride or sulfate forms, all were effective in making complete kills of concentrations of $10^6$ bacteria per milliliter and higher. Bacteria tested included *Escherichia coli*, *Streptococcus faecalis*, and *Staphylcoccus aureus*. Several other methods of preparation of the resin-polyiodide bactericide were also used in addition to that described in detail above, with comparable results. In one alternative, the reacted resin is washed with an aqueous solution of potassium iodide before washing with the distilled water, to insure conversion of any excess iodine or higher polyiodine ions to $I_3^-$, thereby insuring saturation of the resin ion exchange sites with triiodide ion. In general, greater washing is required to prepare the demand bactericide by the column contact of this example than by the batch contract method of Example I.

EXAMPLE III

When the demand bactericide has been properly prepared, a column of the reacted resin can be treated with distilled water or with solutions of up to 500 parts per million of sulfate, chloride or nitrate ions, without detectable concentrations of iodine, triiodide or other oxidizing iodine appearing in the eluent. The detection tests are made with a cadmium iodine-linear starch reagent: Lambert, Anal. Chem., 23, 1247 (1957); Lambert and Rhoads, Anal. Chem., 28, 1629 (1956), which will detect concentrations of iodine or its equivalent of other oxidizing agents down to at least 0.2 parts per million (200 p.p.b.). Under some conditions, the sensitivity may extend to as low as 50–100 p.p.b. oxidizing iodine. See Lambert and Olguin, Anal. Chem., 41, 838 (1969). The total concentration of iodine in all forms in the eluent (including the non-oxidizing $I^-$) when distilled water is passed through the column was less than 0.5 parts per million (500 p.p.b.) as determined by neutron activation analysis. Iodide ion release when distilled water is passed through the column produces no more than a faint turpidity of silver iodide when tested with silver nitrate solution. Release of iodide ion is no greater than that with distilled water when solutions of the following anions are passed through the column: 50 parts per million of sulfate ion, or 100 parts per million each of chloride or nitrate ions. Higher concentrations of sulfate (or other anions) will release more iodide ($I^-$) by exchange.

The term "oxidizing iodine" as used herein is intended to refer to iodine in any oxidizing form thereof, including $I_2, I_3^-, I_0^-, I_{03}^-, I_{04}^-$, etc. Fully reduced iodine in the form of iodide ion ($I^-$) is not included. According to well known procedures, if required, the presence of iodide ion ($I^-$) in the treated water can be detected by testing the water with silver nitrate. Usually, no more than a faint turpidity of silver iodide will be observed in the water.

The cadmium iodide-linear starch test reagent can be used for confirming that the content of oxidizing iodine in water which has been treated with the resin-triiodide combination to kill the bacteria therein is below detectable limits. A suitable procedure for tests of disinfected water is as follows: To a 20 ml. sample of the treated water, add one ml. of the cadmium iodide-linear starch reagent, and observe for appearance of a blue color which is indicative of oxidizing agents, such as an oxidizing form of iodine. The presence of a blue color will indicate that at least 200 p.p.b. or more oxidizing iodine is present in the solution, while the absence of a blue color will indicate that the amount of oxidizing iodine present, if any, is below 200 p.p.b.

Where it is desired to pre-treat a freshly prepared, or newly regenerated, batch of the resin-triiodide combination for use in a column, the 20 ml. sample of water can be obtained in the following manner: In a glass tube of 3/16 inch internal diameter, place a 3.8-gram sample of the dry resin-triiodide material. Pass distilled water through the resin bed thus formed at the rate of about 20 ml. per minute. The water may be at ordinary room temperature (i.e. 25°–30°C.). From the test column, collect a 20 ml. sample of the wash water, and test by the procedure described above using the cadmium iodide-linear starch reagent. A negative test (no blue color) indicates the resin triiodide batch is in optimum form for using in treating bacterially contaminated water by the method of this invention.

EXAMPLE IV

Typical bacteria kills, when 3.8 grams of Ionac A-540 quaternary ammonium ion exchange resin in the stable triiodide form was used in a column three-sixteenth inch by four inches with a flow rate of 20 milliliters per minute, were as follows: Suspensions of *Escherichia coli* were reduced from $1.3 \times 10^5$ to zero viable counts per milliliter; suspensions of *Streptococcus faecalis* were reduced from $1.1 \times 10^4$ to zero viable counts per milliliters; and suspensions of *Staphylococcus aureus* were reduced from $1.8 \times 10^4$ to zero viable counts per milliliter. The standard membrane filter technique was used to count *E. coli* and *S. faecalis;* the standard agar plate count was employed to determine *S. aureus* numbers. With the untreated resin in the chloride or sulfate form, suspensions of *E. coli* were reduced from 200 viable bacteria per milliliter to 120 per milliliter, indicating little if any kill or retention in the untreated column. When 30 grams of Rexyn 201 resin-triiodide combination was used in a column, suspensions of $^{14}$C-labeled *E. coli* with viable count of $3.0 \times 10^5$ permilliliter were reduced to zero viable count per milliliter; recovery of radioactivity in the eluent averaged 95.2% when samples were taken at 100 milliliter intervals up to 600 milliliter total sample, indicating that practically all of the killed bacteria passed through the column. Similar results were obtained with $^{14}$C-labeled *S. faecalis*. A 4.0 gram column of Ionac A-540 resin-triiodide combination, on an attempted exhaustion test, killed $1.95 \times 10^9$ *E. coli* in 15 liters, with little loss in effectiveness up to the time the test was discontinued.

Standard sterile nutrient broth was charged with approximately 100 *E. coli* per milliliter through an Ionac A-540 triiodide column, the viable count was reduced to zero, but the nutrient broth on subsequent inoculation supported *E. coli* growth. This indicates that organic matter in an aqueous medium, such as nutrient broth, is not substantially altered by contact with the column.

EXAMPLE V

Laboratory scale preparations of quaternary ammonium (strong base) ion exchange resins according to a method similar to that set out in the foregoing examples were made with Rexyn 201 (Fisher Scientific Co.) and Amberlite IRA-400 (Mallinckrodt Chemical Works) and tests of bacteria kills were made. A column of 30 grams of Rexyn 201-triiodide in a column measuring three-fourths inch by 8 inches effected reduction of a suspension of $10^5$ viable *Escherichia coli* per milliliter to zero viable counts, when a flow rate of 60 milliliters per minute was used. The same resin without the bound triiodide ions effected a reduction of a suspension of 100 bacteria per milliliter to 30 viable counts per milliliter, indicating little if any kill by the untreated resin column. The same Rexyn 201 resin-triiodide ion combination at 20 ml./min. rate with a column weighing four grams and measuring three-sixteenths inch by four inches reduced the viable count of suspension of $10^4$ *Streptococcus faecalis* per milliliter to zero. A similar column of Amberlite IRA-400 resin-triiodide ion combination effected total kill of a suspension of $1.3 \times 10^4$ E. coli by reducing the viable counts to zero.

EXAMPLE VI

Other strong base resins can be used to prepare a resin-triiodide ion bactericide similar to those made with quaternary ammonium exchange resins, including tertiary sulfonium resins, quaternary phosphonium resins and alkyl pyridinium resins. A sample of a tertiary sulfonium ion exchange resin in the sulfate form was obtained, and a resin-triiodide ion column was prepared in the same manner as described above the quaternary ammonium strong base resins. The capacity of this particular resin did not appear to be as great as the quaternary ammonium resins used, but upon treatment of a suspension of $1.35 \times 10^5$ E. coli per milliliter with a column of this combination, the viable count was reduced to zero. This demonstrated that strong base resins other than quaternary ammonium resins can be used to prepare effective bactericides with triiodide.

EXAMPLE VII

Antibacterial test data are summarized below in Tables A and B:

Table A

| | Antibacterial Capabilities Of Indicated Resin-$I_3$ Complexes[a] | Viable Counts Of E. coli per ml.[b] | |
|---|---|---|---|
| Brand Of Resin | Description | Before Passing | After Passing |
| Ionac A-540 (Matheson, Coleman & Bell) | Polystyrene alkyl quaternary ammonium type, medium porosity | $3.0 \times 10^5$ | 0 |
| Stamex S-44 (Private source) | Polystyrene tertiary sulfonium type | $1.3 \times 10^5$ | 0 |
| Rexyn 201 (Fisher Scientific Co.) | Polystyrene alkyl quaternary ammonium type, medium porosity | $1.0 \times 10^5$ | 0 |
| Amberlite IRA-400S (Mallinckrodt Chemical Works) | Polystyrene alkyl quaternary ammonium type, medium porosity | $1.4 \times 10^4$ | 0 |
| Amberlite IRA-400S (Mallinckrodt Chemical Works) | Polystyrene alkyl quaternary ammonium type, high porosity | $1.2 \times 10^4$ | 0 |

[a] 3.8 grams of each resin was treated with triiodide ion and tested for its ability to kill E. coli suspended in water flowing at a rate of 20 ml. per minute.
[b] Standard Methods for the Examination of Water and Waste Water, pp. 592-593, 12th ed. 1965, American Public Health Association, New York.

Table B

| Viable Counts Of Indicated Organisms[a] Before and After Passing Through 3.8 Gram Columns Of Ionac A-540-$I_3$[b] | | |
|---|---|---|
| | Viable Count Per ml.[c] | |
| Organism[d] | Before Passing | After Passing |
| Salmonella typhimurium | $1.0 \times 10^6$ | 0 |
| Escherichia coli | $3.0 \times 10^5$ | 0 |
| Pseudomonas aeruginosa | $1.3 \times 10^5$ | 0 |
| Staphylococcus aureus | $1.8 \times 10^4$ | 0 |
| Streptococcus faecalis | $1.1 \times 10^4$ | 0 |

[a] Untreated and iodide saturated columns had negligible effects on the viable counts.
[b] The cells were suspended in water and passed through the columns at a flow rate of 20 ml. per minute.
[c] See note [a], Table A.
[d] E. coli and S. faecalis are used as indicators of fecal contamination in the U.S.A. and Europe, respectively. Salmonella and Staphylococcus are pathogens. Pseudomonas (species) are water contaminants. Escherichia, Salmonella, and Pseudomonas are gram negative, whereas S. faecalis and S. aureus are gram positive.

A 4 year old, 30-gram column of the disinfectant, was found to be effective and able to kill $10^6$ E. coli ($9.9 \times 10^5$) 100% (total kill).

A 3.8-gram column of the disinfectant sterilized 15 liters of a suspension containing $10^5$ E. coli per ml. No decrease in killing ability was noted.

The mechanism of action of the resin-insolubilized triiodide has not been fully established. Possibly, the antibacterial action can be explained by the assumption of a charge distribution in the bound triiodide of:

Resin—$N^+$——$^-$I–I–I $^{\delta+}$
($^{\delta+}$ designates a partial positive charge)

If the $I_3^-$ ion is polarized as indicated, the partial positive charge on the terminal iodine atom could be effective in attracting negatively charged bacteria to it. Once the bacterium and the bound $I_3^-$ group are in close enough proximity in the micro-environment of the resin beads' outer surfaces, it is possible that one or even two iodine atoms might react directly with the —$_{SH}$ groups of the cell wall.

Whatever the exact mechanism of action, it can be described generally as a "demand" action, as distinguished from the water elution of a bactericidal concentration of iodine. In other words, the release of the killing iodine by the resin is primarily in response to the presence of the bacteria. This general mode of action is responsible for the 100% kill of bacteria without leaving residual oxidizing iodine which must be removed. It is also responsible for the high killing capacity and long life of the disinfectant under ordinary conditions of use, such as the treatment of potable water at pH's from 6 to 8 and temperatures from 20° to 30°C. In fact, the disinfectant is substantially stable at pH's and temperatures outside these ranges.

Experiments illustrating the properties of the resin are set out below:

EXAMPLE X

Triiodide-resin disinfectant was preapared as previously described and washed until no oxidizing iodine was detectable in the room temperature wash water. Temperature tests were then made on the disinfectant.

Boling water at nearly 100°C. was passed through three 30-gram columns of the disinfectant. No iodine was eluted, according to the cadmium iodide-linear starch reagent test. The temperatures remained above the 85°C. when tested, as it was collected in a flask. Traces of the halide ion, $I^-$, were detected in all the eluents. (The cadmium iodide-linear starch test was made after cooling the eluents to room temperature, as the reagent would not indicate the presence of iodine at 85° or 100°C.)

11

When three columns were placed in a bath at 80°C. for 24 hours, no iodine was detected by the cadmium iodide-linear starch test when cooled solutions were tested at intervals of several hours. One of the columns was still able to effectively kill bacteria even after the column had been kept six days in the 80°C. bath.

EXAMPLE XI

An experiment bearing on the demand action of the stable triiodide resin disinfectant was conducted.

Three dialysis sacks, 0.25 inch in diameter, containing 3 ml. each of $1.4 \times 10^6$ *E. coli* per ml. were placed in a flask containing the resin-triiodide disinfectant. The sacks were securely tied at both ends. They then were placed in a 37°C. bath and shaken. The sacks were opened and tested as indicated in Table C.

Table C

| Sack No. | Time in Hours | No. of Viable E. coli Remaining in Sack (per ml.)* | Dissolved Iodine in Sack Solution |
|---|---|---|---|
|   | 0 | $1.4 \times 10^6$ | — |
| 1 | 2 | $1.05 \times 10^6$ | none |
| 2 | 4 | $1.93 \times 10^5$ | none |
| 3 | 25 | 0** | none |

*Death rate probably approaching that of normal attrition (however, one cannot depend on attrition to completely sterilize water).
**One plate had the equivalent of $3.7 \times 10^4$ E. coli; fourteen plates were absolutely sterile.

The conclusion indicated is that bacteria contact or near contact is necessary. Mere dissolved iodine eluted from the resin disinfectant is not able to completely kill $10^6$ *E. coli* per ml. except after prolonged periods. However, if the customary disinfectant method employing column passage of the water plus viable bacteria, total kill of $10^6$ *E. coli* per ml. occurs within seconds. This is evidence that a demand phenomenon is operating. Otherwise the $10^6$ *E. coli* per ml. are not killed until sufficient iodine is removed from the resin-triiodide to satisfy the static equilibrium requirements.

EXAMPLE XII

An experiment to show that the killing mechanism does not depend on eluted iodine was conducted. The eluent from columns in which water is disinfected by the method of this invention contains less than 200 p.p.b. of iodine as $I_2$, as proven by the cadmium iodide-linear starch reagent test. When one p.p.m. of bacterial protoplasm ($10^6$ *E. coli* per ml.) is suspended in this water, previously passed through a column containing the resin-triiodide disinfectant, the *E. coli* are not all killed — over 1000 ($10^3$) per ml. remain viable. Yet when a suspension of $7.4 \times 10^7$ *E. coli* is passed through a column, 100% kill is obtained. The $7.4 \times 10^7$ bacteria represent 74 p.p.m. of bacteria protoplasm. The only way to supply the amount iodine necessary to get 100% kill and explain the phenomenon is on a demand basis. Merely dissolving iodine to the extent of 200 p.p.b. will not destroy 1 p.p.m. ($10^6$ bacteria) of live *E. coli*.

A further experiment to demonstrate that the strong base resin-triiodide disinfectant of this invention operates on a demand basis and without eluting bactericidal concentrations of iodine or triiodide ion into solution was conducted as follows:

Four columns were prepared and tested for disinfecting ability. Two of the columns were 100% saturated and the other two were 97% saturated on a triiodide ion-quaternary ammonium site basis. *Escherichia coli*,

12

$1.8 \times 10^7$ per ml., were suspended in distilled water and passed through the columns. The *E. coli* were reduced to zero viable counts. Next, iodine solutions containing at least 0.2 parts per million (200 p.p.b.) as measured by the cadmium iodide-linear starch reagent were prepared. When these solutions were passed through each of the four columns, collected, and immediately tested for iodine or other oxidizing iodine species, none was detectable. This showed that the disinfectant removes iodine when it is present in concentrations above the minimum detection level, and indicates that the disinfectant works on a demand basis. Lethal concentrations of iodine in the vicinity of the disinfectant resin beads are available upon demand for killing bacteria, but concentrations of iodine in the water in contact with the disinfectant is maintained below detectable levels.

We claim:

1. The process for producing a triiodide demand bactericide, comprising preparing an aqueous solution of iodine which is present therein essentially as triiodide ions ($I_3^-$), contacting said triiodide solution with a porous granular strong base anion exchange resin having the strongly basic groups thereof in a salt form reactable with triiodide ions, and contacting being continued until sufficient triiodide has reacted with said strongly basic groups that bacterially contaminated water is disinfected when passed through a bed of the reacted resin, and removing water-elutable iodine from said resin, said removing being continued until the reacted resin can be washed with distilled water at a temperature of 25° to 30°C. without obtaining in the wash water a concentration of oxidizing iodine detectable by reacting said wash water with a cadmium iodidelinear starch test reagent.

2. The triiodide demand bactericide produced by the process of claim 1.

3. The process of claim 1 in which said strongly basic groups of said resin are quaternary ammonium groups.

4. The process of claim 1 in which said quaternary ammonium groups are benzyl trimethyl ammonium groups.

5. The process of claim 4 in which said quaternary ammonium groups before said contacting are in a salt form selected from the class consisting of chloride and sulfate.

6. The process for producing a triiodide demand bactericide, comprising preparing an aqueous solution of iodine which is present therein essentially as triiodide ions ($I_3^-$), contacting said triiodide solution with a porous granular quaternary ammonium anion exchange resin containing said quaternary ammonium groups as benzyl trimethyl quaternary ammonium groups in a salt form reactable with triiodide ions, said contacting being continued until sufficent triiodide has reacted with said quaternary ammonium groups that bacterially contaminated water is disinfected when passed through a bed of the reacted resin, and removing water-elutable iodine from said resin, said removing being continued until the reacted resin can be washed with distilled water at a temperature of 25° to 30°C. without obtaining in the wash water a cncentration of oxidizing iodine detectable by reacting said wash water with a cadmium iodide-linear starch test reagent.

7. The triiodide demand bactericide produced by the process of claim 6, said bactericide being further characterized by containing sufficient triiodide to kill 100 percent of the bacteria in water passed therethrough up to a bacterial concentration in said water of $10^6$ bacteria per milliliter.

8. The process of claim 6 in which said quaternary ammonium groups before said contacting are in a salt form selected from the class consisting of chloride and sulfate.

9. The process for producing a demand bactericide, comprising reacting a quaternary ammonium anion exchange resin containing residual tertiary amine groups with an alkylating reagent to convert the tertiary amine groups therein to quaternary ammonium groups, said alkylating agent providing alkyl groups of from 1 to 4 carbons, the resulting anion exchange resin containing essentially only quaternary ammonium groups as the anion exchange groups therein, converting the anion exchange groups of said resin to the triiodide salt form thereof, and washing said converted resin with water until said resin is essentially free of water-elutable triiodide.

10. The process of claim 9 in which said alkylating reagent is a methylating reagent.

11. The process of claim 10 in which said methylating reagent is dimethyl sulfate.

12. The process of claim 9 in which said alkylated quaternary ammonium resin prior to said conversion is in a salt form other than the iodide form.

* * * * *